(12) United States Patent
Bao et al.

(10) Patent No.: US 9,280,987 B1
(45) Date of Patent: Mar. 8, 2016

(54) METHODS AND APPARATUS FOR SELECTING DATA DENSITY AND TRACK DENSITY VALUES FOR MAGNETIC RECORDING MEDIA HAVING VARIABLE BIT ASPECT RATIOS

(71) Applicant: Seagate Technology LLC, Cupertino, CA (US)

(72) Inventors: Haoji Bao, Toa Paoh (SG); Myint Ngwe Maung, Singapore (SG); Cheun Pin Tan, Singapore (SG); Jose Mari Toribio, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/744,908

(22) Filed: Jun. 19, 2015

(51) Int. Cl.
 *G11B 5/09* (2006.01)
 *G11B 27/36* (2006.01)
 *G11B 5/596* (2006.01)
 *G11B 5/012* (2006.01)

(52) U.S. Cl.
 CPC *G11B 5/09* (2013.01); *G11B 5/596* (2013.01); *G11B 27/36* (2013.01); *G11B 5/012* (2013.01)

(58) Field of Classification Search
 CPC ...... G11B 5/09; G11B 5/012; G11B 20/1217; G11B 5/596; G11B 5/00; G11B 20/10305; G11B 27/3027; G11B 27/36; G11B 2220/2516; G11B 5/3954; G11B 20/1403

USPC .................................. 360/31, 55, 48, 51, 53
 See application file for complete search history.

(56) References Cited

U.S. PATENT DOCUMENTS

| | | | |
|---|---|---|---|
| 7,283,316 B2 * | 10/2007 | Chiao | G11B 5/012 360/31 |
| 8,842,503 B1 | 9/2014 | Rausch et al. | |
| 8,896,961 B1 | 11/2014 | Harllee, III | |
| 8,941,937 B1 | 1/2015 | Toribio et al. | |
| 9,030,772 B2 * | 5/2015 | Kim | G11B 5/09 360/48 |
| 2013/0170064 A1 | 7/2013 | Kim | |

\* cited by examiner

*Primary Examiner* — Ali Neyzari
(74) *Attorney, Agent, or Firm* — Ryan, Mason & Lewis, LLP (57) ABSTRACT

An exemplary method for selecting data density values (e.g., bits per inch) and track density values (e.g., tracks per inch) for magnetic recording media having variable bit aspect ratios comprises obtaining a plurality of data density values and a plurality of track density values as a function of a corresponding plurality of bit error rates; determining a data density/track density correlation between the plurality of data density values and the plurality of track density values for at least one Sector Error Rate; and determining a data density capability value and a track density capability value that provides an areal density capability value that satisfies one or more predefined criteria (e.g., a substantially maximum areal density capability value) using the data density/track density correlation. A selected data density value and a selected track density value are optionally determined for a given target areal density capability using the data density/track density correlation and the determined data density capability value.

20 Claims, 12 Drawing Sheets

FIG. 4
TPI VS. BPI CORRELATION

METHODS AND APPARATUS FOR SELECTING DATA DENSITY AND TRACK DENSITY VALUES FOR MAGNETIC RECORDING MEDIA HAVING VARIABLE BIT ASPECT RATIOS

FIELD

The field relates generally to magnetic storage, and more particularly, to determining one or more parameters for a magnetic recording medium having a variable bit aspect ratio (VBAR).

BACKGROUND

Magnetic data storage systems commonly include one or more magnetic recording heads that write and read information to and from a magnetic recording medium, respectively. Variable bit aspect ratio capabilities have been suggested to allow some zones of a magnetic recording medium to have a different target bit aspect ratio (BAR) than other zones. See, for example, U.S. Pat. No. 8,842,503, assigned to the assignee of the present application and incorporated by reference herein. Bit aspect ratio is often expressed as a ratio of the down-track dimension (e.g., length) of a bit with respect to the cross-track dimension (e.g., width) of a bit.

VBAR can be used, for example, to designate different zones on the magnetic recording medium for different purposes, such as for capacity purposes and for performance purposes. Generally, large capacity recording media tend to have smaller bit aspect ratios to accommodate the increased number of storage bits on the media, while higher performance media tend to have larger bit aspect ratios to accommodate access requirements. VBAR can be used to improve functionality of a single magnetic recording medium, for example, when part of the disk drive is needed for performance and another part is needed for capacity. Different zones in different regions of a recording medium can thus have different bit aspects ratios and associated areal density capabilities (ADCs) (measured, for example, in gigabits per square inch (GBPSI)).

In Shingle Magnetic Recording (SMR) technology, two-dimensional VBAR (2D-VBAR) techniques have been suggested to maximize ADC values by varying bit aspect ratios in two dimensions (e.g., BARs linearly along given tracks and BARs based on track pitch). Generally, while one-dimensional VBAR schemes measure one pair of a data density value (e.g., bits per inch (BPI)) and a track density value (e.g., tracks per inch (TPI)) and gives one ADC under one predefined condition, two-dimensional VBAR allows measurement of multiple pairs of BPI/TPI values and selects the maximum ADC out of all of the measurements.

A need remains for improved techniques for selecting data density values (e.g., bits per inch picked (BPIP)) and track density values (e.g., tracks per inch picked (TPIP)) in multi-dimensional VBAR systems in order to meet a target capacity. A further need remains for multi-dimensional techniques for selecting data density values and track density values that make use of measurement results collected during 2D-VBAR processing to obtain a correlation between data density values and track density values for various bit error rates (BERs).

SUMMARY

Illustrative embodiments of the present invention provide methods and apparatus for selecting data density and track density values for magnetic recording media having variable bit aspect ratios. In one embodiment, an exemplary method comprises obtaining a plurality of data density values (e.g., a number of bits per inch) as a function of a corresponding plurality of bit error rates; obtaining a plurality of track density values (e.g., a number of tracks per inch) as a function of a corresponding plurality of bit error rates; determining a data density/track density correlation between the plurality of data density values and the plurality of track density values for at least one Sector Error Rate; and determining a data density capability value and a track density capability value that provides an areal density capability value that satisfies one or more predefined criteria (e.g., a substantially maximum areal density capability value) using the data density/track density correlation.

In at least one embodiment, the exemplary method also comprises the step of determining a selected data density value and a selected track density value for a given target areal density capability using the data density/track density correlation and the determined data density capability value that provides the areal density capability value that satisfies the one or more predefined criteria.

In one or more exemplary embodiments, an effective data density margin comprises a difference between the selected data density value and the data density capability value, and an effective track density margin comprises a difference between the selected track density value and a track density value selected based on the selected data density value.

In an exemplary three-dimensional format picker embodiment, data density/track density correlations are determined for a plurality of Sector Error Rates, and the data density capability value and the track density capability value that provides the areal density capability value that satisfies the one or more predefined criteria are determined for each of the plurality of Sector Error Rates. A performance gauge is optionally obtained that evaluates the areal density capability value for each of the plurality of Sector Error Rates with respect to performance losses. An adaptive track density margining factor is optionally computed based on a difference between two areal density capability values that satisfy the one or more predefined criteria.

As noted above, illustrative embodiments described herein provide significant improvements relative to conventional techniques for selecting data density and track density values for magnetic recording media having variable bit aspect ratios.

DETAILED DESCRIPTION

Illustrative embodiments of the present invention will be described herein with reference to exemplary communication systems and associated servers, clients and other processing devices. It is to be appreciated, however, that the invention is not restricted to use with the particular illustrative system and device configurations shown. While the exemplary embodiments refer to parameters with certain exemplary units, such as bits per inch and tracks per inch, the present invention can be more generally applied to data density values and track density values, as would be apparent to a person of ordinary skill in the art.

Aspects of the present invention provide improved techniques for selecting data density values (e.g., bits per inch picked (BPIP)) and track density values (e.g., tracks per inch picked (TPIP)) in multi-dimensional VBAR systems in order to meet a target capacity. According to one aspect of the invention, measurement results collected during 2D-VBAR are used by a multi-dimensional format picker to obtain a correlation between data density values and track density values for various bit error rates (BERs).

A conventional one-dimensional format picker processes one pair of BPIC/TPIC values and assumes that BPI and TPI are independent. According to one aspect of the invention, an exemplary two-dimensional format picker processes one pair of BPIC/TPIC values which are correlated to each other based on the obtained correlation. According to another aspect of the invention, the exemplary two-dimensional format picker employs an effective margin to characterize the correlation in the picker.

According to a further aspect of the invention, an exemplary three-dimensional format picker processes multiple pairs of correlated BPIC/TPIC values and evaluates different ADC values at different performance levels. According to another aspect of the invention, the exemplary three-dimensional format picker employs an adaptive margin to provide a reduced performance loss along the capacity extension.

Figure 1:
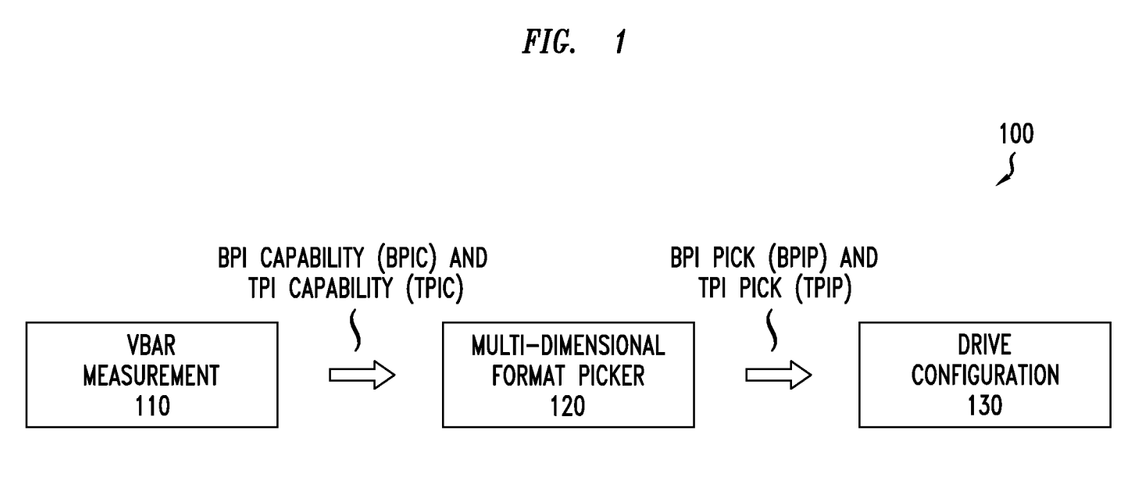
FIG. 1 illustrates an exemplary process for determining one or more parameters to configure a magnetic recording medium in accordance with one exemplary embodiment of the present invention.

FIG. 1 illustrates an exemplary process 100 for determining one or more parameters to configure a magnetic recording medium (not shown) in accordance with aspects of the present invention. As shown in FIG. 1, a VBAR measurement process 110 determines BPI Capability (BPIC) and TPI Capability (TPIC) values.

Generally, BPIC values are typically measured by adjusting channel frequency until the Bit Error Rate on a test track satisfies a Target Bit Error Rate (or Sector Failure Rate (SFR)). In addition, TPIC values are typically measured by adjusting the Track Spacing until the Sector Failure Rate on the test track satisfies a Target Sector Failure Rate.

The BPIC and TPIC values from the VBAR measurement process 110 are processed by a multi-dimensional format picker 120 incorporating aspects of the present invention to produce BPI Pick (BPIP) and TPI Pick (TPIP) to make a final drive configuration 130. In at least one embodiment, the multi-dimensional format picker 120 aims to select BPIP and TPIP values that meet a target capacity and also minimize performance loss, if any. Generally, the BPI and TPI values are adjusted from initial BPIC/TPIC values determined by the VBAR measurement process 110 to final BPIP/TPIP values that satisfy the target capacity.

Figure 2:
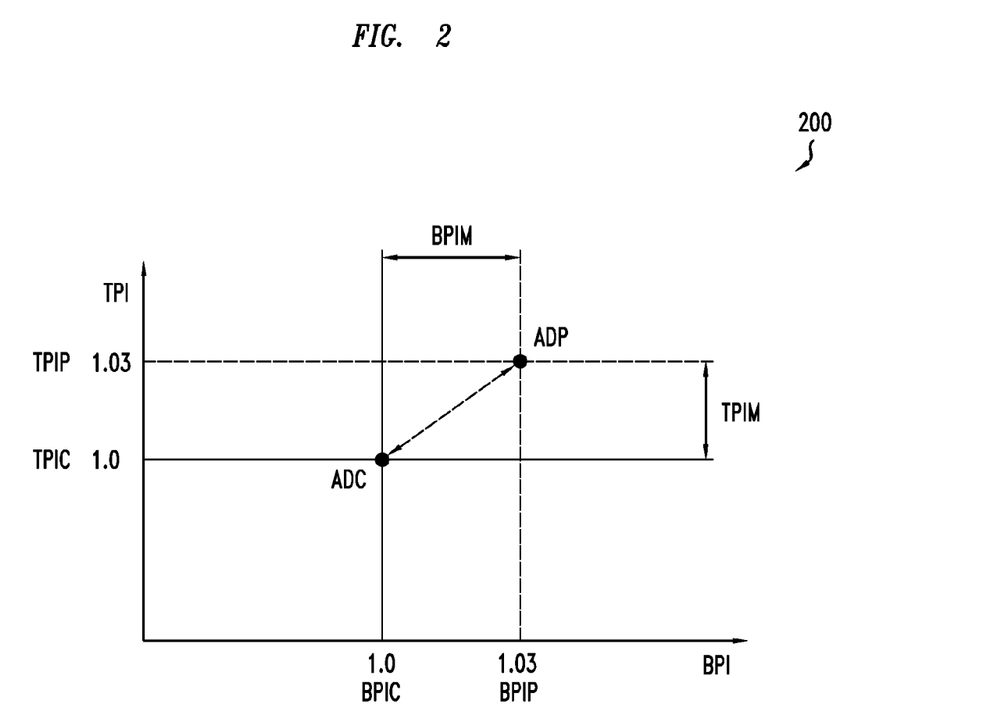
FIG. 2 illustrates a conventional format picker process that determines one or more parameters for a magnetic recording medium.

FIG. 2 illustrates a conventional format picker process 200. As shown in FIG. 2, the conventional format picker process 200 processes the BPIC and TPIC values (determined, for example, by the VBAR measurement process 110) to produce BPIP and TPIP values needed for the drive configuration 130, in a known manner.

TPI Margining Factor (TPIMF) is a coefficient that determines a proportion between BPI and TPI values when capacity is extended or relaxed. For example, for a TPIMF equal to 0.5, BPI and TPI are treated with an equal weight.

An areal density capability (ADC) (e.g., in gigabits per square inch (GBPSI)) is the point in FIG. 2 where BPI is equal to BPIC and TPI is equal to TPIC. Generally, it is known that ADC is equal to BPI multiplied by TPI.

Likewise, areal density picked (ADP) is the point in FIG. 2 meeting the capacity requirement where BPI is equal to BPIP and TPI is equal to TPIP. In the case of FIG. 2, BPI/TPI are both stressed by 3% when there is a 6% total capacity shortfall.

FIG. 2 also indicates the BPI Margin (BPIM) and TPI Margin (TPIM) values, defined as follows:

$$BPIM = BPIP - BPIC \qquad (1)$$

$$TPIM = TPIP - TPIC \qquad (2)$$

BPI and TPI Correlation

As discussed hereinafter in conjunction with FIGS. 3A and 3B, one aspect of the invention obtains a plurality of BPI values (generally referred to herein as data density values) and a plurality of TPI values (generally referred to herein as track density values) as functions of a corresponding plurality of bit error rates. In addition, as discussed further below in conjunction with FIG. 4, a BPI/TPI correlation (generally referred to herein as data density/track density correlation) is determined between the plurality of data density values and the plurality of track density values for at least one Sector error rate (SER).

Figure 3A:
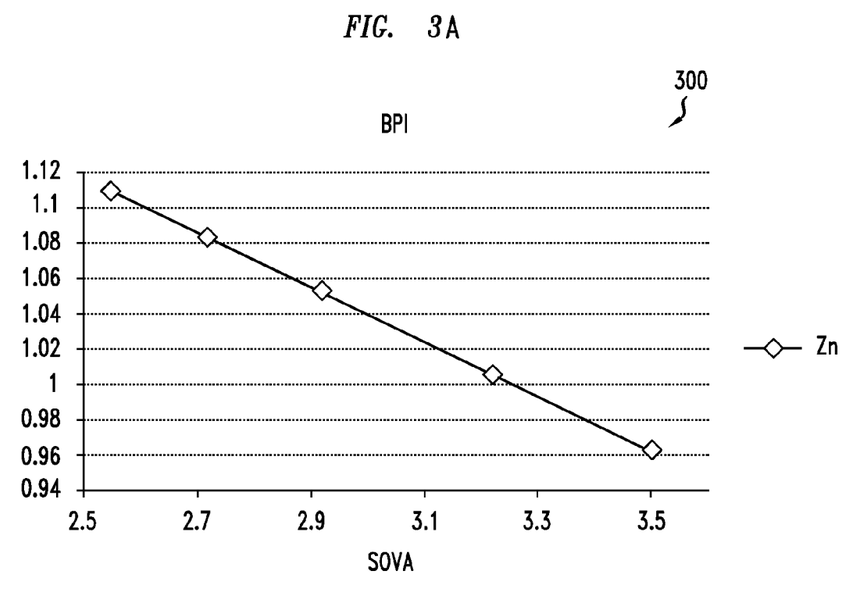
FIGS. 3A and 3B illustrate a plurality of BPI values and TPI values, respectively, as a function of a corresponding plurality of bit error rates.

FIG. 3A illustrates a plurality of BPI values as a function 300 of a corresponding plurality of bit error rates (e.g., Soft Output Viterbi Algorithm (SOYA)). These values can be obtained, for example, from the VBAR measurement process 110 of FIG. 1.

Figure 3B:
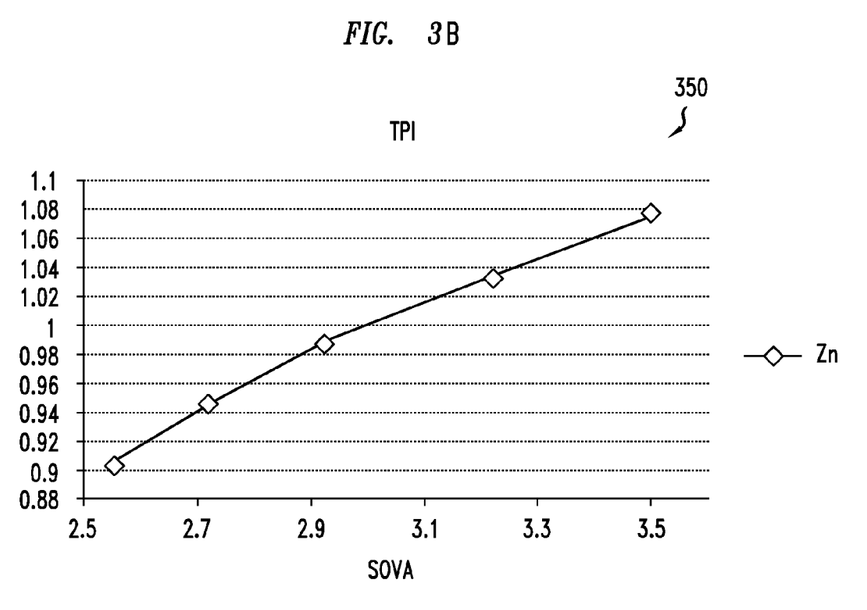

FIG. 3B illustrates a plurality of TN values as a function 350 of a corresponding plurality of bit error rates (e.g., SOYA). These values can be obtained, for example, from the VBAR measurement process 110 of FIG. 1.

Figure 3C:
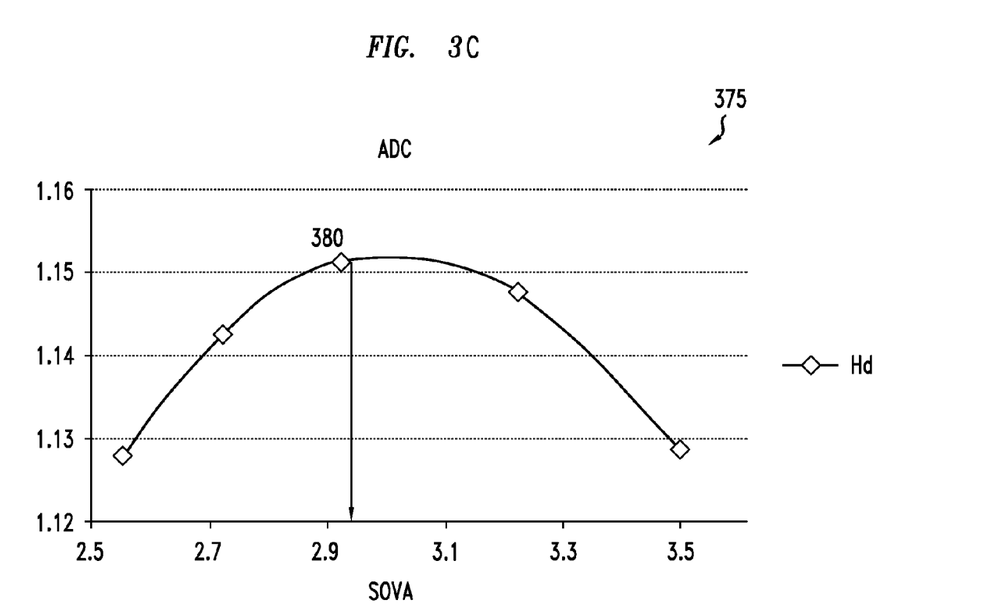
FIG. 3C illustrates ADC values corresponding to FIGS. 3A and 3B as a function of a corresponding plurality of bit error rates.

FIG. 3C illustrates the corresponding ADC values as a function 375 of a corresponding plurality of bit error rates (e.g., Soft Output Viterbi Algorithm (SOYA)) for the BPI values and TPI values of FIGS. 3A and 3B. As noted above, ADC is equal to BPI multiplied by TPI for a given bit error rate. The maximum ADC value 380 is typically selected and the corresponding BPIC and TPIC are processed by the format picker process 200 (FIG. 2) to determine the ADP value with conventional techniques. For example, in FIG. 3C, a SOVA (BER) value of 2.92 is selected as the maximum ADC and the corresponding BPIC and TPIC values are subsequently processed by the format picker process 200.

Figure 4:
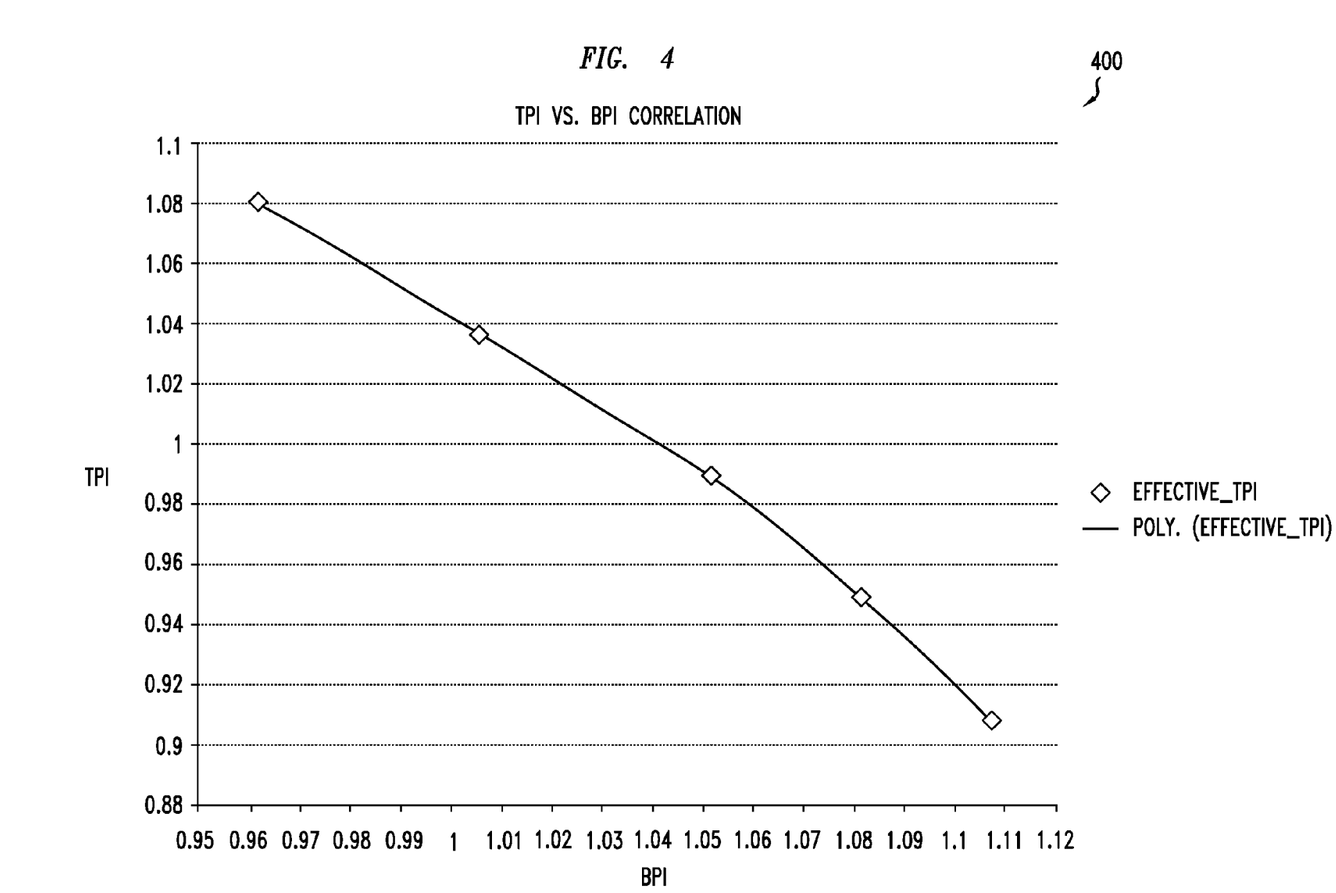
FIG. 4 illustrates an exemplary BPI/TPI correlation between the plurality of BPI values of FIG. 3A and the plurality of TN values of FIG. 3B.

As noted above, a BPI/TPI correlation (generally referred to herein as data density/track density correlation) is determined between the plurality of BPI values (FIG. 3A) and the plurality of TPI values (FIG. 3B) for at least one Sector error rate (SER). FIG. 4 illustrates an exemplary BPI/TPI correlation 400 between the plurality of BPI values (FIG. 3A) and the plurality of TPI values (FIG. 3B). Each point in FIG. 4 represents a BAR combination of BPI and TPI, while guaranteeing a same Sector error rate (SER) performance. In addition, the BPI/TPI correlation 400 provides visibility into the TPI dimension of how TPI changes as a function of BPI to maintain the same performance and likewise for how BPI changes as a function of TPI. In this manner, a format picker 120 in accordance with aspects of the invention has knowledge of BPI/TPI two-dimensional changes.

Two-Dimensional Format Picker

As discussed hereinafter, one aspect of the invention employs the BPI/TPI correlation 400 of FIG. 4 to select BPI picked (BPIP) and TPI picked (TPIP) values for a given target ADC.

Each point on the curve of FIG. 4 implies an ADC (since ADC is equal to BPI multiplied by TPI). Thus, the maximum ADC can be found by solving the following equation system:

$$y=f(x)$$

$$g(x)=x*y$$

$$g'(x)=0 \tag{3}$$

where x indicates BPI, y indicates TN, f(x) is the fit line (e.g., transfer function) of FIG. 4 and g'(x) is the derivative of g(x).

After solving equation (3), a new maximum ADC point is selected, which may be different than the ADC value selected using the conventional format picker 200 of FIG. 2.

Figure 5:
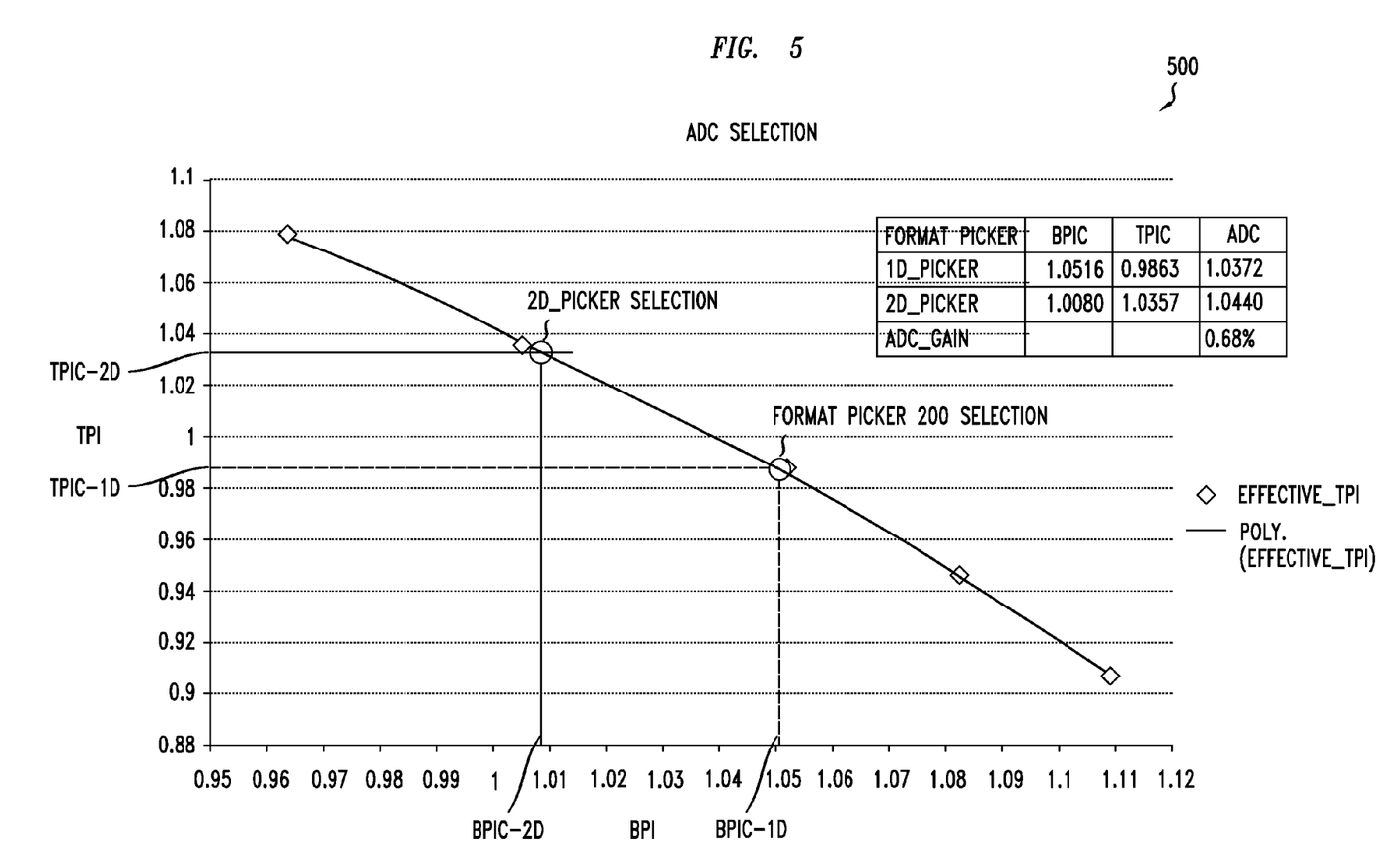
FIG. 5 illustrates selection of an ADC for a single zone of a magnetic recording medium.

FIG. 5 illustrates ADC selection 500 for a single zone of a magnetic recording medium. As shown in FIG. 5, the exemplary conventional format picker process 200 (also referred to as a 1D_Picker) selects a BPIC-1D value of 1.0516 and a TPIC-1D value of 0.9863, with a corresponding ADC-1D value of 1.0372. For the exemplary BPI/TPI correlation 400 of FIG. 4, after solving equation (3), a format picker process in accordance with aspects of the present invention (also referred to as a 2D_Picker) selects a BPIC-2D value of 1.0080 and a TPIC-2D value of 1.0357, with a corresponding ADC-2D value of 1.0440 (for an exemplary ADC gain of 0.68%). The same procedure can be repeated for different zones of the magnetic recording medium (not shown).

Capacity Extension (Push) by Two-Dimensional Format Picker

Aspects of the present invention extend the capacity determination of the VBAR process using a multi-dimensional format picker process. In addition, aspects of the present invention recognize that the BAR correlation derived in FIG. 5 forms a constraint to guide how BPIC/TPIC should move together in pairs. For example, if the BPIC value increases, the TPIC value needs to decrease in response. Therefore, the BPI Margin (BPIM) and TPI Margin (TPIM) values, discussed above in conjunction with FIG. 2 and equations (1) and (2) are no longer valid when using a multi-dimensional format picker process.

Figure 7:
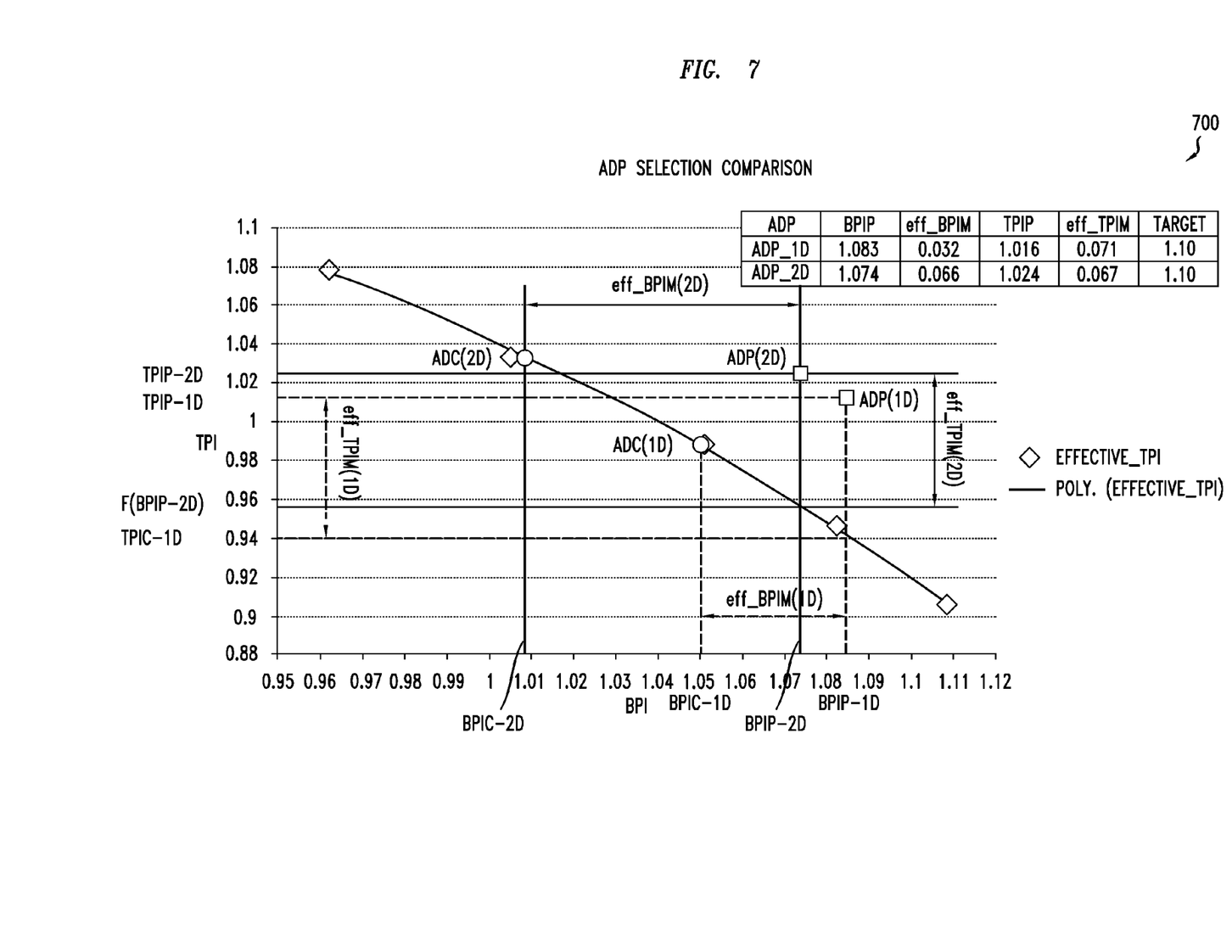
FIG. 7 illustrates a multi-dimensional format picker process incorporating aspects of the invention.

Thus, additional aspects of the invention provide an effective margin to take BAR correlation into consideration. Mathematically, effective margin is defined as follows:

$$\mathit{eff\_BPIM}=BPIP-BPIC \tag{4}$$

$$\mathit{eff\_TPIM}=TPIP-f(BPIP) \tag{5}$$

where f(x) is the characterizing function of the BAR correlation (e.g., the transfer function of FIG. 4). As discussed further below in conjunction with FIG. 7, f(BPIP) is the TPI value where the determined BPIP value crosses the correlation, f(x).

With the introduction of effective margin, the capacity determination of the VBAR process can be extended using the disclosed multi-dimensional format picker process, by solving for (x, y) in the following equations:

$$xy=T \tag{6}$$

$$x-z=y-f(x) \tag{7}$$

where T is the target ADC, (x, y) indicates the selected (BPIP, TPIP) values to meet the target ADC, z is the BPIC associated with the maximum ADC, and f(x) is the BAR correlation (f(x)=$-2.419x^2+3.8493x-0.3865$ for the example correlation of FIG. 4).

Continue the example in FIG. 5, where z (BPIC-2D associated with the maximum ADC) is equal to 1.0080 and assume a target ADC T equal to 1.1. By substitution, equations (6) and (7) can be reduced to the following cubic equation:

$$2.4190x^3-4.8493x^2+1.3945x+1.1=0 \tag{8}$$

where x is the final BPIP to be selected.

Equation (8) is a third order polynomial. There are a number of known techniques for solving a third order polynomial, such as a Monte Carlo Simulation to determine x (BPIP) and subsequently determine y (TPIP). The roots are approximated by running a Monte Carlo Simulation with x (BPIP) ranging from 0.9621 to 1.1087, corresponding to the range for 2D-VBAR minimum and maximum SOYA selection as in FIG. 3A.

Figure 6:
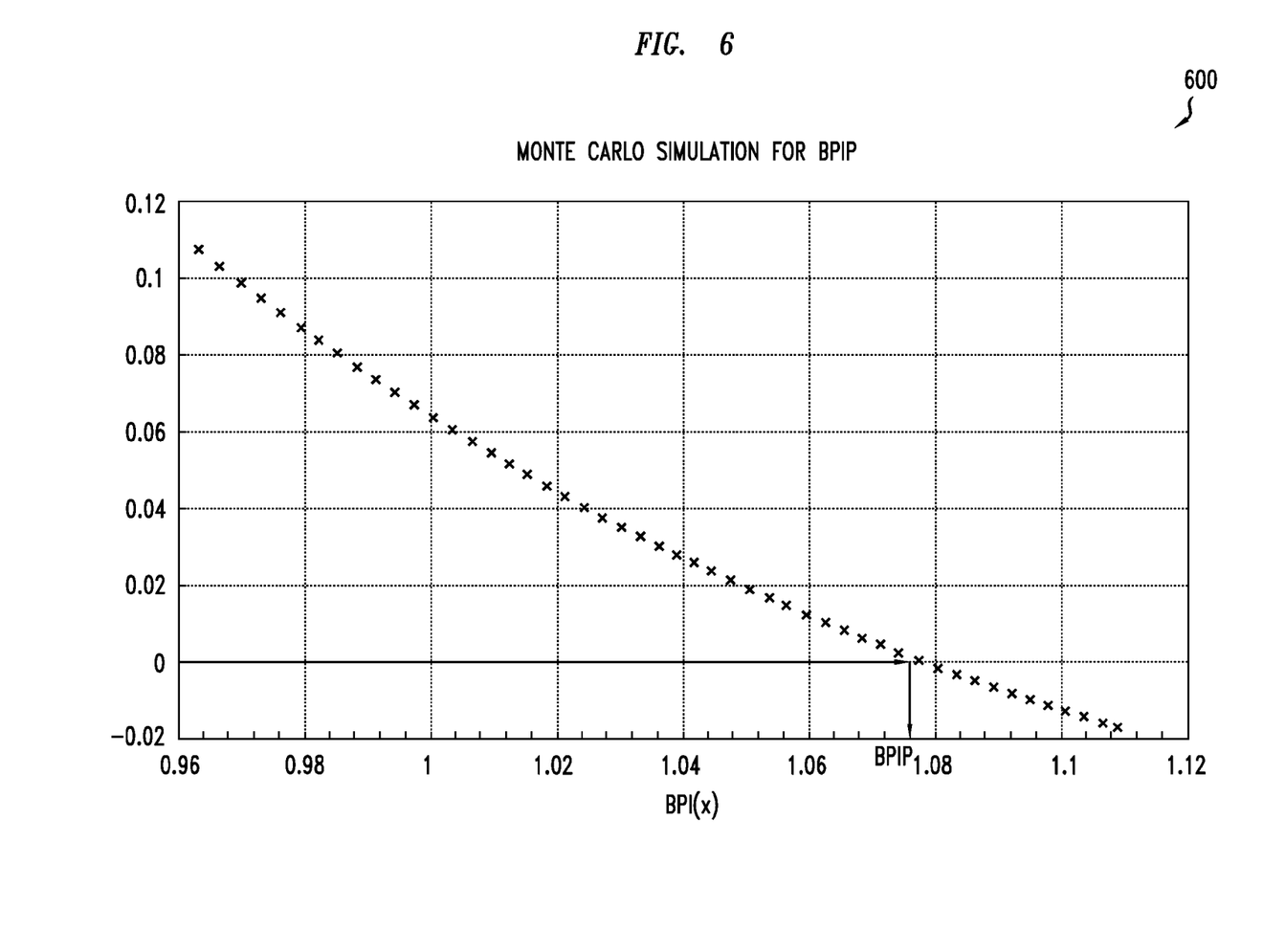
FIG. 6 illustrates an exemplary Monte Carlo Simulation to solve for BPIP.

FIG. 6 illustrates an exemplary Monte Carlo Simulation 600 to solve for BPIP. As shown in FIG. 6, BPIP is the zero crossing point. Thus, the BPIC value is known from the VBAR process, the BPIP value is known from the Monte Carlo Simulation 600 and the effective BPI margin can be calculated using equation (4).

Likewise, given BPIP-2D from FIG. 6 (BPIP=1.074) and the given target ADC, the TPIP-2D value can be calculated using equation (6).

FIG. 7 illustrates a multi-dimensional format picker process 700 incorporating aspects of the invention. FIG. 7 is drawn to best fit the image and is not to scale. As shown in FIG. 7, the format picker process 700 processes the BPIC and TPIC values (determined, for example, by the VBAR measurement process 110) to produce BPIP and TPIP values needed for the drive configuration 130. As indicated above, in at least one embodiment, BPIP-2D is obtained using the Monte Carlo Simulation 600 of FIG. 6, and given the determined BPIP-2D from FIG. 6 (BPIP=1.074) and the given target ADC, the TPIP-2D value can be calculated using equation (6).

As shown in FIG. 7, the effective margins are different using the conventional format picker process (FIG. 2) and the disclosed multi-dimensional format picker process 700 of FIG. 7. With the disclosed multi-dimensional format picker process 700 of FIG. 7, the effective BPI margin and effective TN margin are almost equal and in this way, the VBAR shares the same stress level between BPI and TPI.

Three-Dimensional Format Picker

An additional aspect of the invention provides a three-dimensional format picker that, in at least one embodiment, allows the performance loss to be quantified when extending ADC and can be employed without a suitable pre-defined TPIMF.

Figure 8:
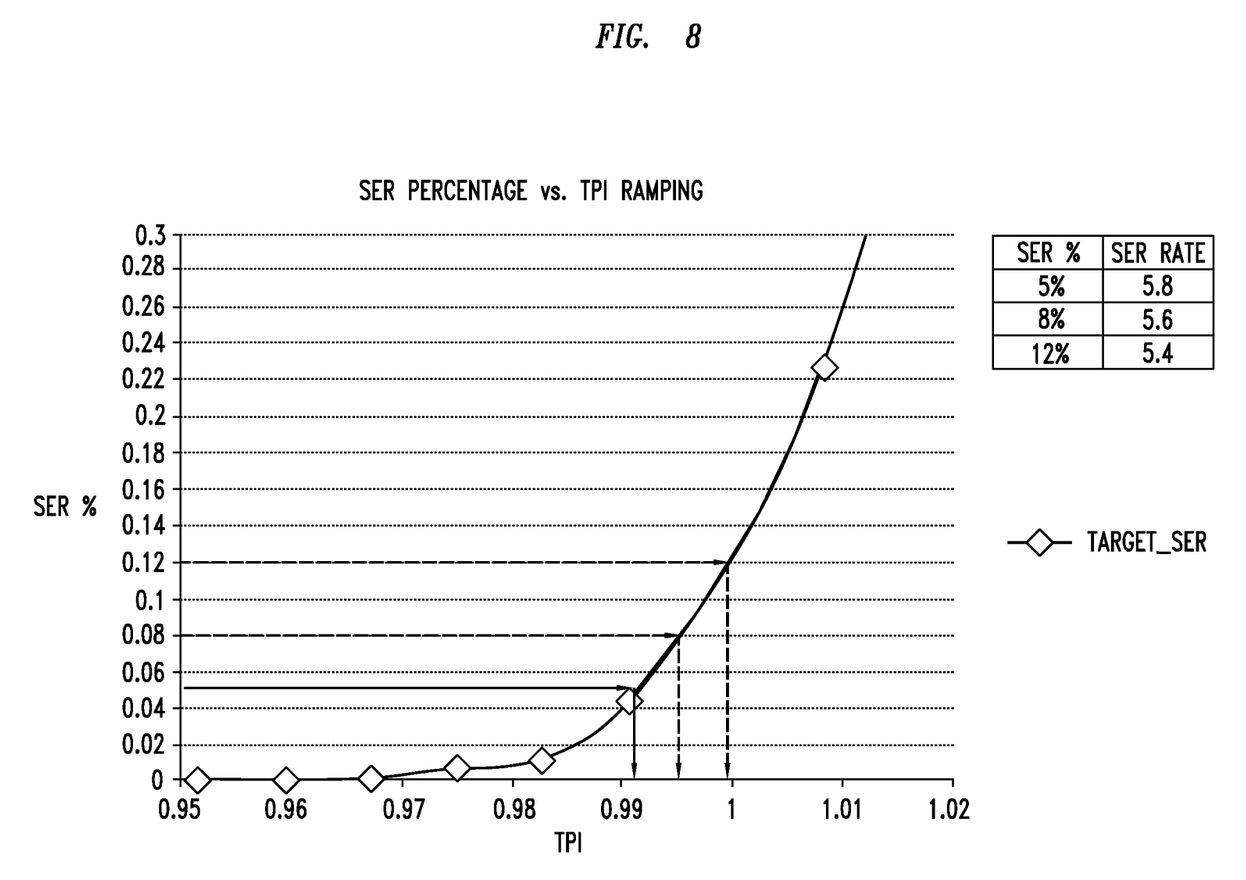
FIG. 8 illustrates a measurement of TPIC as the sector error rate percentage is varied for a given BPIC.

FIG. 8 illustrates a measurement of TPIC as the sector error rate percentage is varied for a given BPIC. In FIG. 8, TPI continues to ramp up until it hits a SER percentage failure and a TPIC at this SER is declared. A trend line is used to connect the raw measurement points and interpolation is used to identify TPI at a specified SER percentage.

The x-axis in FIG. 8 follows TPI increment (where higher numbers indicate more stressful TPIs). The y-axis is the sector error rate percentage. The y-axis is measured by the number of sectors in error divided by the total number of sectors read multiplied by 100%. For example, if 300 sectors are read and 30 sectors are in error, then the SER % is equal to 10% (30/300*100%).

As shown in FIG. 8, for an example SER of 5% (solid line), a TPIC value of 0.991 is obtained. Additional TPICs are measured at different SERs, say, 5.6 and 5.4, as shown by the dotted lines. The additional captured TPICs provide insights on TPI gain compared to performance loss. It is noted that these TPIC points are captured based on the same measurement data and no additional measurement is required.

In current implementations, the SER percentage is typically set to 5% (corresponding to an SER rate 5.8). FIG. 8 also provides a look-up table of conversions between SER percentages to SER rates. SER rates can be derived from SER %, which is a more commonly used metric in HDD industry, as follows:

$$\text{SER rate} = \log(\text{SER \%}/(4096 \times 8)) \quad (9)$$

For example, given an SER % of 10%, its corresponding SER rate is −5.52 (normally the negative sign is neglected, as it is commonly known that it should be negative). When measuring SER % as in FIG. 8, at every given TPI, a test track is written one time and the SER %_1 is measured. In addition, adjacent tracks are written six times and the test track is measured again for SER %_2. The delta of SER %_2 minus SER %_1 is the value logged in the y-axis. When doing this measurement, both BPI and TPI will play a part on the results yield, hence, it provides a performance gauge indicating how well the drive can perform at the current BPI/TPI configuration.

Figure 9:
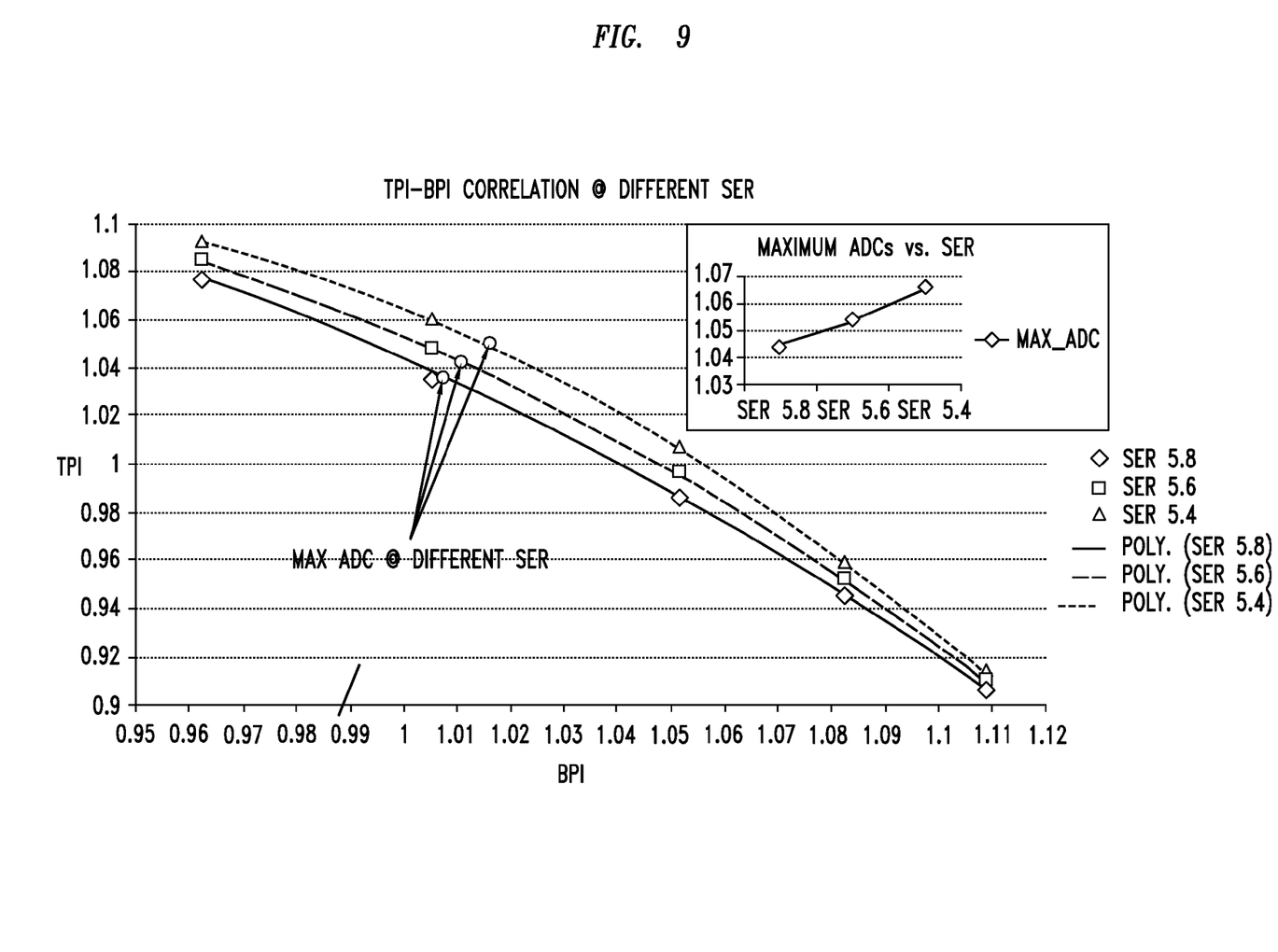
FIG. 9 illustrates the TPI/BPI correlation for a plurality of sector error rates, as well as the corresponding maximum ADC values.

The capture of additional TPIC values in FIG. 8, allows the BAR correlation to be generated at each SER of interest. FIG. 9 illustrates the TPI/BPI correlation for a plurality of sector error rates, as well as the corresponding maximum ADC values. Generally, FIG. 9 illustrates the measurements of FIG. 8 repeated for different BPI values. As shown in FIG. 9, BAR correlation expands as SER decreases (generally, more ADC is available when bearing more performance loss). The maximum ADC value at each SER rate can be obtained using the same method described above in conjunction with equation system (3) and FIG. 3C (there are different f(x)s corresponding to different SERs). These maximum ADC values, at different SERs, are also plotted in FIG. 9. The same procedures can be repeated for additional zones of the magnetic medium.

Each correlation line in FIG. 9 is a combination of BPI/TPI at one specific SER. FIG. 9 quantifies performance loss when moving from one line to another, which is one more dimension of information. Thus, the three-dimensional format picker provides one more dimension (a performance gauge) than the two-dimensional format picker. The three-dimensional format picker enables a certification process to have a leverage control of trade-off between ADC and performance. Significantly, this trade-off can be quantified and measured for different drives.

Capacity Extension (Push) by Three-Dimensional Format Picker

Aspects of the present invention extend the capacity determination of the VBAR process using a three-dimensional format picker process. In at least one embodiment, the exemplary three-dimensional format picker process first determines the target ADC.

Figure 10:
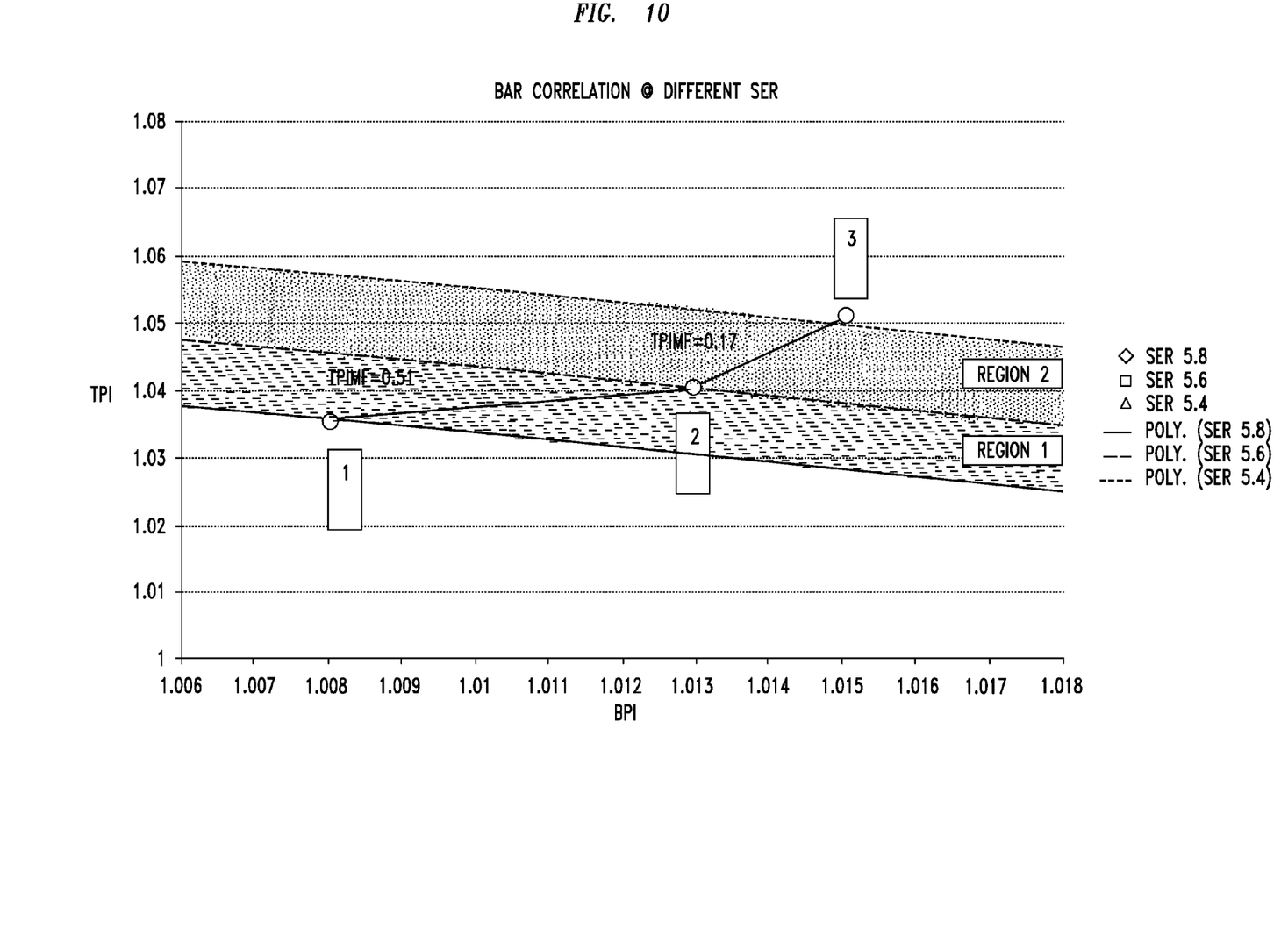
FIG. 10 illustrates a magnified view of a portion of the TPI/BPI correlation of FIG. 9 for a plurality of sector error rates.

FIG. 10 illustrates a magnified view of a portion of the TPI/BPI correlation of FIG. 9 for a plurality of sector error rates, into areas comprising the maximum ADC points of FIG. 9. As each maximum ADC is obtained for a different SER rate, the location of the target ADC is known (in this example, region 1 or 2). Once determined, the ADC extension should follow the arrow shown in FIG. 10, to obtain the largest ADC gain and minimum SER loss.

To extend the ADC along the path, the TPIMF is manipulated where the ratio of BPI/TPI extension is defined. In the example of FIG. 10, TPIMF must equate to 0.51 or 0.17 to push from region 1 or region 2, respectively.

TPIMF can be calculated using the following equation:

$$TPIMF = \frac{d\_BPIC}{d\_BPIC + d\_TPIC} \quad (10)$$

where d_BPIC/TPIC is the difference between two maximum ADC points in a region. Thus, TPIMF is essentially the reciprocal of the slope of the arrow in the graph of FIG. 10.

In this way, adaptive TPIMF is expected for different zones, head and different target capacity as well. Adaptive TPIMF ensures ADC push along the most rational path, e.g., the arrow shown in FIG. 10.

The methods and processes described herein may be executed during certification processing of the magnetic storage media to determine the density parameters of the recording surface(s) in order to ensure that the medium meets the target capacity while ensuring satisfactory read/write performance and reliability of the medium. In one or more embodiments, the VBAR tuning processes may perform the methods and processes described herein for processing the data density capability values and track density capability values and selecting a data density value and a track density value.

According to one or more embodiments, the methods and processes described herein may be implemented in a controller as software, hardware, or any combination of the two.

For example, the methods and processes described herein may be stored in a memory as part of the firmware of a storage device and may be executed by a processor for performing the methods and processes described herein. The methods and processes described herein may alternatively or additionally be stored in other computer-readable media accessible by the controller. In further embodiments, the methods and processes described herein may be implemented in a computing system external to and operably connected to the storage device, such as in a driver module of a host device connected to storage device through an interface, for example. The methods and processes described herein may further be stored in a memory or other computer-readable media accessible by the computing system and be executed by a processor of the computing system.

CONCLUSION

The foregoing applications and associated embodiments should be considered as illustrative only, and numerous other embodiments can be configured using the format picker techniques disclosed herein.

It should also be understood that multi-dimensional format picker techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The multi-dimensional format picker may be implemented using one or more processing platforms. One or more of the processing modules or other components may therefore each run on a computer, storage device or other processing platform element. A given such element may be viewed as an example of what is more generally referred to herein as a "processing device."

Figure 11:
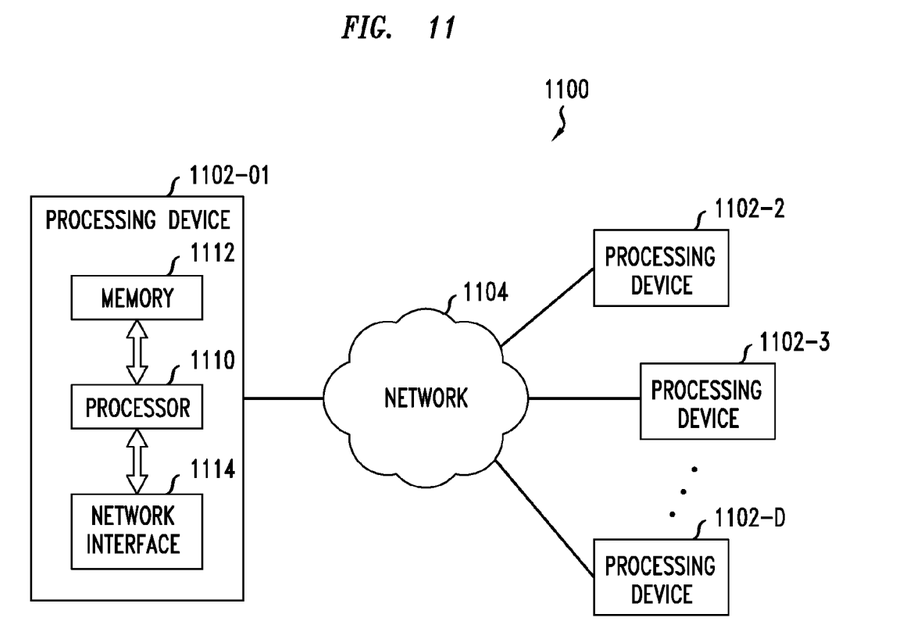
FIG. 11 illustrates an exemplary processing platform that may be used to implement at least a portion of one or more embodiments of the invention.

Referring now to FIG. 11, one possible processing platform that may be used to implement at least a portion of one or more embodiments of the invention is shown. The processing platform 1100 in this embodiment comprises at least a portion of the given system and includes at least one processing device(s), denoted 1102-1, 1102-2, 1102-3, . . . 1102-D, which communicate with one another over a network 1104. The network 1104 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1102-1 in the processing platform 1100 comprises a processor 1110 coupled to a memory 1112. The processor 1110 may comprise a microprocessor, a microcontroller, an application specific integrated circuit (ASIC), a field programmable gate array (FPGA) or other type of processing circuitry, as well as portions or combinations of such circuitry elements, and the memory 1112, which may be viewed as an example of a "computer program product" having executable computer program code embodied therein, may comprise random access memory (RAM), read only memory (ROM) or other types of memory, in any combination.

Also included in the processing device 1102-1 is network interface circuitry 1114, which is used to interface the processing device with the network 1104 and other system components, and may comprise conventional transceivers.

The other processing devices 1102, if any, of the processing platform 1100 are assumed to be configured in a manner similar to that shown for processing device 1102-1 in the figure.

Again, the particular processing platform 1100 shown in the figure is presented by way of example only, and the given system may include additional or alternative processing platforms, as well as numerous distinct processing platforms in any combination, with each such platform comprising one or more computers, storage devices or other processing devices.

Multiple elements of the system may be collectively implemented on a common processing platform of the type shown in FIG. 11, or each such element may be implemented on a separate processing platform.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a tangible recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

It should again be emphasized that the above-described embodiments of the invention are presented for purposes of illustration only. Many variations and other alternative embodiments may be used. For example, the techniques are applicable to a variety of other types of magnetic storage media that can benefit from the multi-dimensional format picking processes as disclosed herein. Also, the particular configuration of processing device elements shown herein, and the associated multi-dimensional format picker techniques, can be varied in other embodiments. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
obtaining a plurality of data density values as a function of a corresponding plurality of bit error rates;
obtaining a plurality of track density values as a function of a corresponding plurality of bit error rates;
determining a data density/track density correlation between the plurality of data density values and the plurality of track density values for at least one Sector Error Rate (SER); and
determining a data density capability value and a track density capability value that provides an areal density capability (ADC) value that satisfies one or more predefined criteria using the data density/track density correlation.

2. The method of claim 1, further comprising the step of determining a selected data density value and a selected track density value for a given target areal density capability using the data density/track density correlation and the determined data density capability value that provides the areal density capability value that satisfies the one or more predefined criteria.

3. The method of claim 2, wherein the selected data density value and the selected track density value are determined by solving a third order polynomial.

4. The method of claim 1, wherein an effective data density margin comprises a difference between the selected data density value and the data density capability value.

5. The method of claim 1, wherein an effective track density margin comprises a difference between the selected track density value and a track density value selected based on the selected data density value.

6. The method of claim 1, wherein the obtained plurality of data density values and the obtained plurality of track density values are obtained from a process that determines a multi-dimensional variable bit aspect ratio.

7. The method of claim 1, wherein the plurality of data density values are based on a number of bits per inch and wherein the plurality of track density values are based on a number of tracks per inch.

8. The method of claim 1, wherein the one or more predefined criteria comprise a substantially maximum areal density capability value.

9. The method of claim 1, wherein the step of determining a data density/track density correlation is performed for a plurality of Sector Error Rates.

10. The method of claim 9, further comprising the step of performing the step of determining the data density capability value and the track density capability value that provides the areal density capability value that satisfies the one or more predefined criteria for each of the plurality of Sector Error Rates.

11. The method of claim 10, further comprising the step of obtaining a performance gauge that evaluates the areal density capability value for each of the plurality of Sector Error Rates with respect to performance losses.

12. The method of claim 10, further comprising the step of computing an adaptive track density margining factor based on a difference between two areal density capability values that satisfy the one or more predefined criteria.

13. A tangible machine-readable recordable storage medium, wherein one or more software programs when executed by one or more processing devices implement the following steps:
obtaining a plurality of data density values as a function of a corresponding plurality of bit error rates;
obtaining a plurality of track density values as a function of a corresponding plurality of bit error rates;
determining a data density/track density correlation between the plurality of data density values and the plurality of track density values for at least one Sector Error Rate (SER); and
determining a data density capability value and a track density capability value that provides an areal density capability (ADC) value that satisfies one or more predefined criteria using the data density/track density correlation.

14. An apparatus, comprising:
a memory; and
at least one hardware device, coupled to the memory, operative to implement the following steps:
obtaining a plurality of data density values as a function of a corresponding plurality of bit error rates;
obtaining a plurality of track density values as a function of a corresponding plurality of bit error rates;
determining a data density/track density correlation between the plurality of data density values and the plurality of track density values for at least one Sector Error Rate (SER); and
determining a data density capability value and a track density capability value that provides an areal density capability (ADC) value that satisfies one or more predefined criteria using the data density/track density correlation.

15. The apparatus of claim 14, wherein the at least one hardware device is further configured to determine a selected data density value and a selected track density value for a given target areal density capability using the data density/track density correlation and the determined data density capability value that provides the areal density capability value that satisfies the one or more predefined criteria.

16. The apparatus of claim 15, wherein the selected data density value and the selected track density value are determined by solving a third order polynomial.

17. The apparatus of claim 14, wherein an effective data density margin comprises a difference between the selected data density value and the data density capability value and wherein an effective track density margin comprises a difference between the selected track density value and a track density value selected based on the selected data density value.

18. The apparatus of claim 14, wherein the obtained plurality of data density values and the obtained plurality of track density values are obtained from a process that determines a multi-dimensional variable bit aspect ratio.

19. The apparatus of claim 14, wherein the step of determining a data density/track density correlation is performed for a plurality of Sector Error Rates and wherein the at least one hardware device is further configured to determine the data density capability value and the track density capability value that provides the areal density capability value that satisfies the one or more predefined criteria for each of the plurality of Sector Error Rates.

20. The apparatus of claim 19, wherein the at least one hardware device is further configured to obtain a performance gauge that evaluates the areal density capability value for each of the plurality of Sector Error Rates with respect to performance losses and compute an adaptive track density margining factor based on a difference between two areal density capability values that satisfy the one or more predefined criteria.

* * * * *